(12) United States Patent
Davies

(10) Patent No.: US 10,570,963 B2
(45) Date of Patent: Feb. 25, 2020

(54) TORQUE LIMITING DEVICE

(71) Applicant: Goodrich Actuation Systems Limited, West Midlands (GB)

(72) Inventor: Stephen Davies, Shrewsbury (GB)

(73) Assignee: GOODRICH ACTUATION SYSTEMS LIMITED, Stratford (GB)

( * ) Notice: Subject to any disclaimer, the term of this patent is extended or adjusted under 35 U.S.C. 154(b) by 128 days.

(21) Appl. No.: 15/466,106

(22) Filed: Mar. 22, 2017

(65) Prior Publication Data

US 2017/0276183 A1   Sep. 28, 2017

(30) Foreign Application Priority Data

Mar. 24, 2016 (EP) ..................... 16162452

(51) Int. Cl.
*F16D 47/02* (2006.01)
*B64C 9/24* (2006.01)
(Continued)

(52) U.S. Cl.
CPC .................. *F16D 3/10* (2013.01); *B64C 9/24* (2013.01); *B64C 13/50* (2013.01); *F16D 3/72* (2013.01);
(Continued)

(58) Field of Classification Search
CPC .......... F16D 47/04; F16D 47/02; F16D 43/02; F16D 41/067; F16D 41/02; F16D 3/10; F16D 3/72; B64C 9/24; B64C 13/50
See application file for complete search history.

(56) References Cited

U.S. PATENT DOCUMENTS 5,234,089 A * 8/1993 Itomi ..................... F16D 7/022
192/48.92
5,899,294 A * 5/1999 Shimizu ................. B62D 5/043
180/443
(Continued)

FOREIGN PATENT DOCUMENTS

CN     104110444 A    10/2014
CN     204024910 U    12/2014
(Continued)

OTHER PUBLICATIONS

ABSSAC, "Torsion Springs ABSSAC", Jan. 2, 2015, XP055316776, Retrieved from the Internet: URL:http://www.abssac.co.uk/p/Torsion+Springs/125/#.WByu-XrdfSi [retrieved on Nov. 4, 2016], 6 pages.
(Continued)

*Primary Examiner* — Jacob S. Scott
*Assistant Examiner* — Lillian T Nguyen
(74) *Attorney, Agent, or Firm* — Cantor Colburn LLP

(57) ABSTRACT

A torque limiting device comprises an input shaft, an output shaft and a machined torsion spring having a first end and a second end. The first end and the second end of the torsion spring are coupled to the both the input shaft and the output shaft, whereby torque is transmitted between the input shaft and output shaft via the torsion spring. The couplings between the torsion spring and the input shaft and the output shaft permit limited relative rotation between the input shaft and the output shaft. The device further comprises a jamming mechanism operable in response to relative rotation between the input shaft and output shaft to stop rotation of both the input shaft and the output shaft.

17 Claims, 8 Drawing Sheets

Spring Shown Un-Sectioned

(51) Int. Cl.
*F16D 3/10* (2006.01)
*F16D 3/72* (2006.01)
*F16D 41/067* (2006.01)
*F16D 47/04* (2006.01)
*F16D 41/02* (2006.01)
*F16D 43/02* (2006.01)
*B64C 13/50* (2006.01)

(52) U.S. Cl.
CPC ........... *F16D 41/02* (2013.01); *F16D 41/067* (2013.01); *F16D 43/02* (2013.01); *F16D 47/02* (2013.01); *F16D 47/04* (2013.01)

(56) References Cited

U.S. PATENT DOCUMENTS

| | | | | |
|---|---|---|---|---|
| 6,164,426 | A * | 12/2000 | Iten | F16D 49/02 192/15 |
| 8,727,091 | B2 * | 5/2014 | Hill | F16D 43/206 192/56.57 |
| 8,888,619 | B2 | 11/2014 | Antchak et al. | |
| 2003/0168138 | A1 * | 9/2003 | Marquardt | C22C 14/00 148/671 |
| 2009/0250308 | A1 * | 10/2009 | Hadley | B64C 13/28 192/223.2 |
| 2011/0072780 | A1 * | 3/2011 | Somerfield | F02K 1/763 60/226.2 |
| 2014/0232225 | A1 | 8/2014 | Heinze et al. | |
| 2016/0016653 | A1 | 1/2016 | Barger | |
| 2016/0223038 | A1 * | 8/2016 | Murphy | B64C 13/28 |

FOREIGN PATENT DOCUMENTS

| | | |
|---|---|---|
| DE | 4206168 A1 | 9/1993 |
| EP | 0873937 A2 | 10/1998 |
| EP | 2889504 A1 | 7/2015 |
| JP | S61124725 U | 8/1986 |

OTHER PUBLICATIONS

Extended European Search Report for International Application No. 16162452.3, dated Nov. 15, 2016, 10 pages.

* cited by examiner

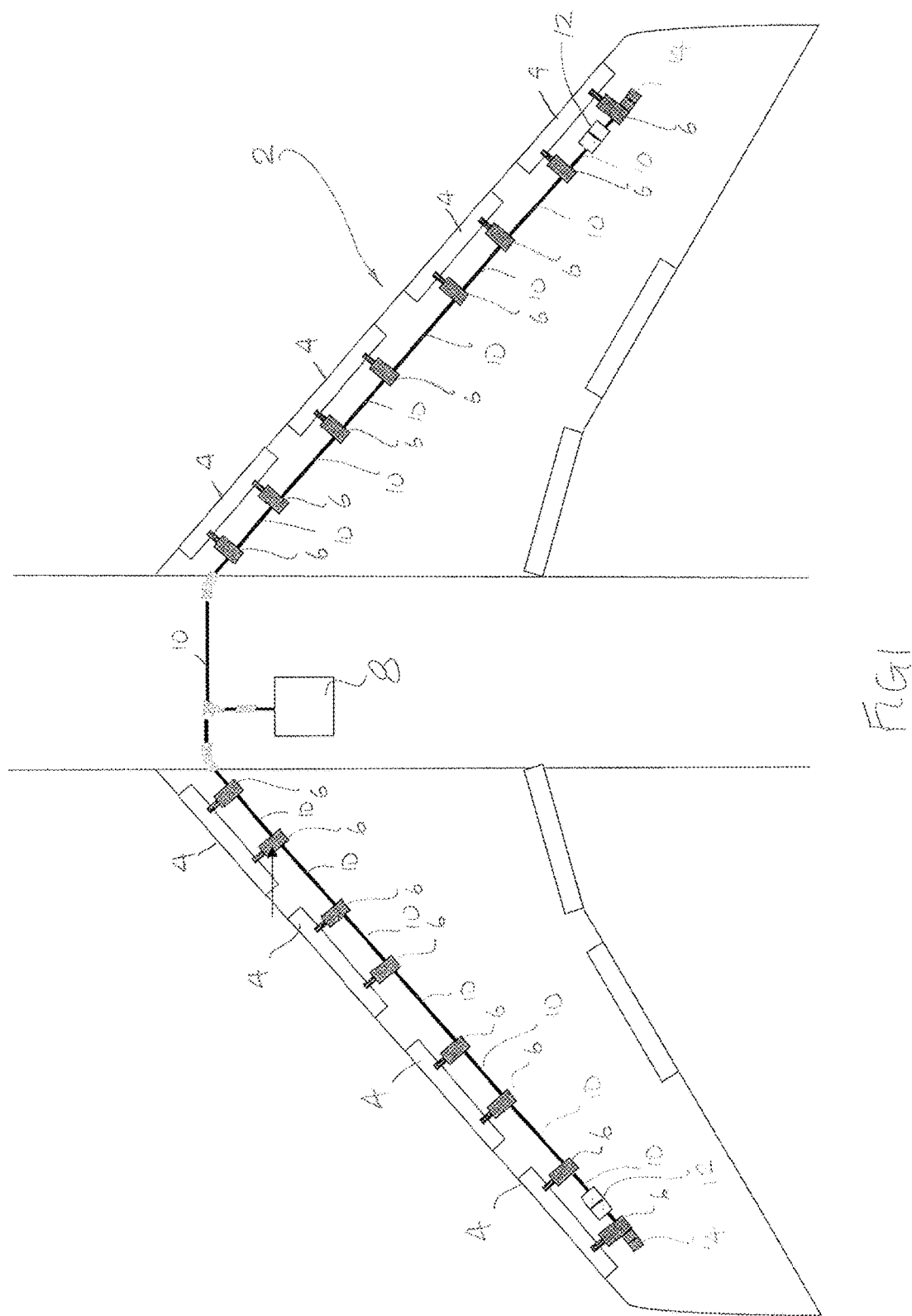

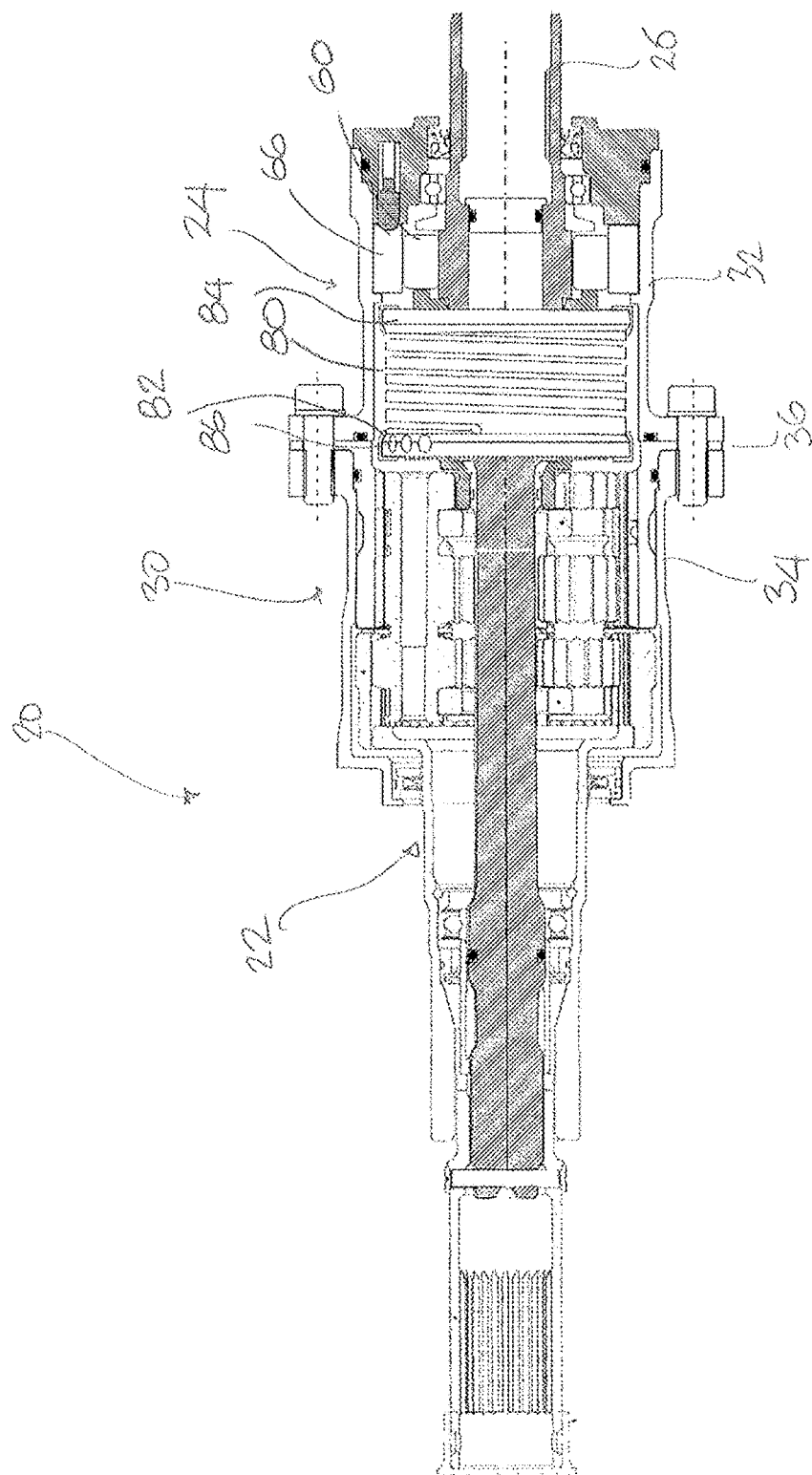

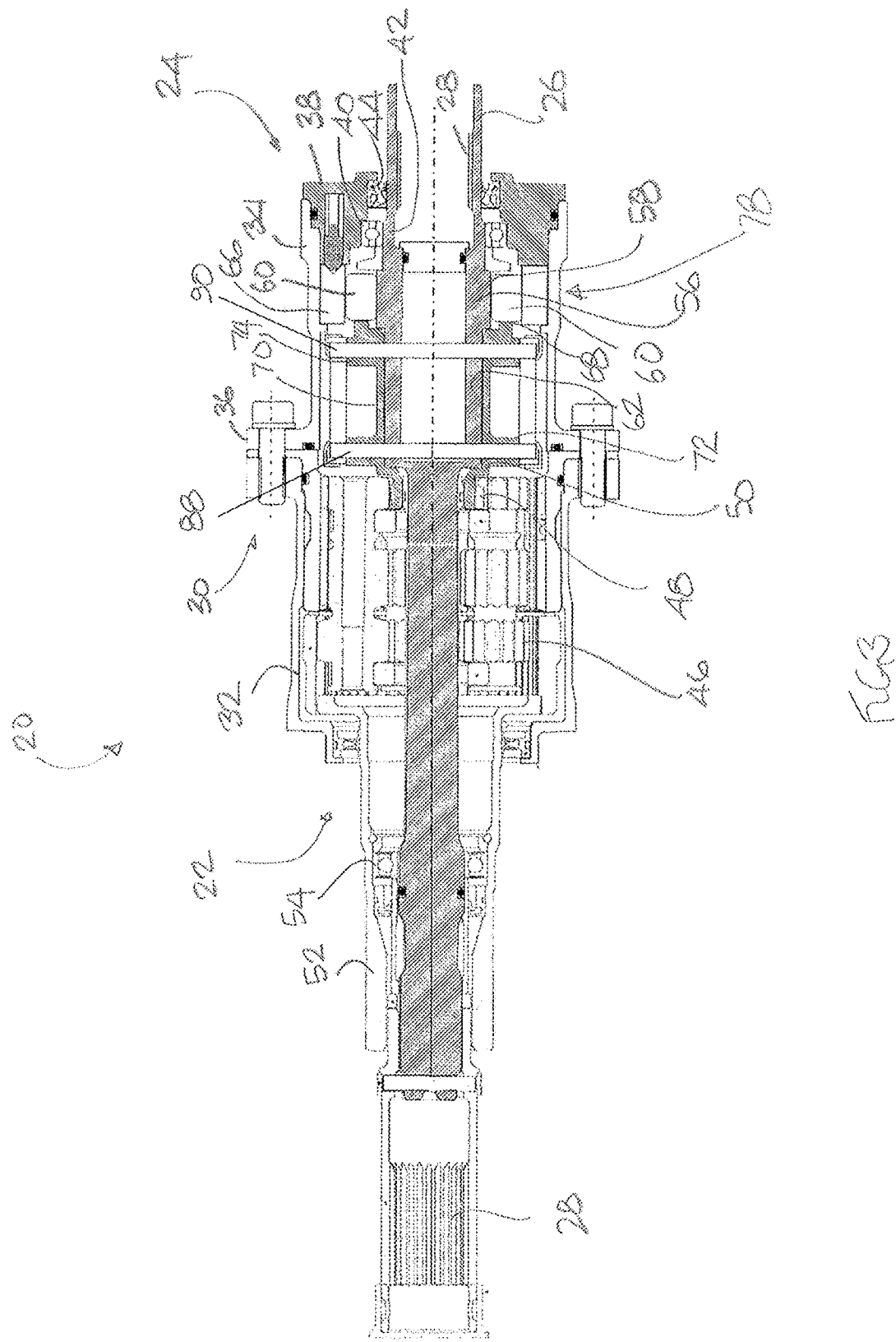

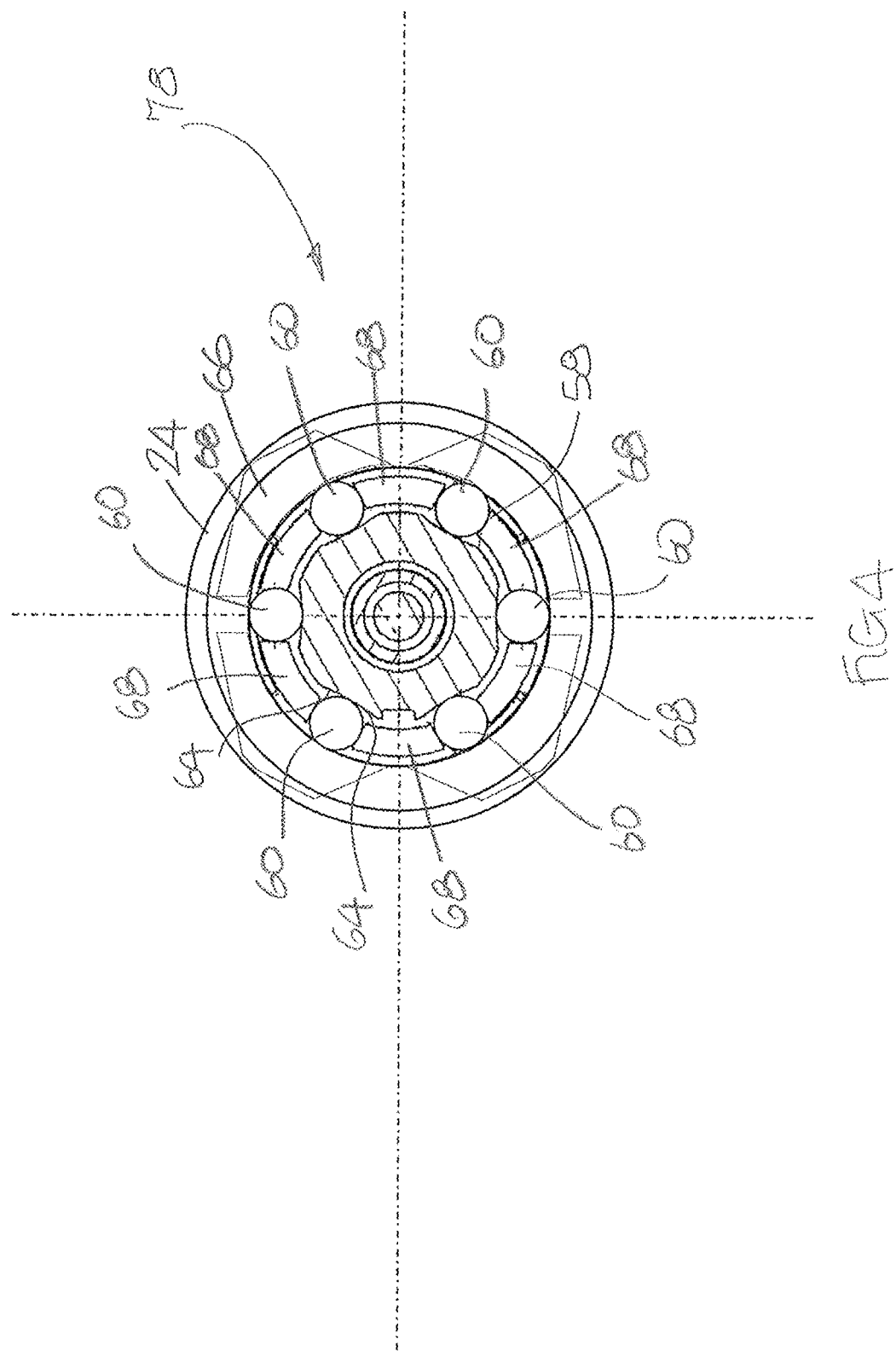

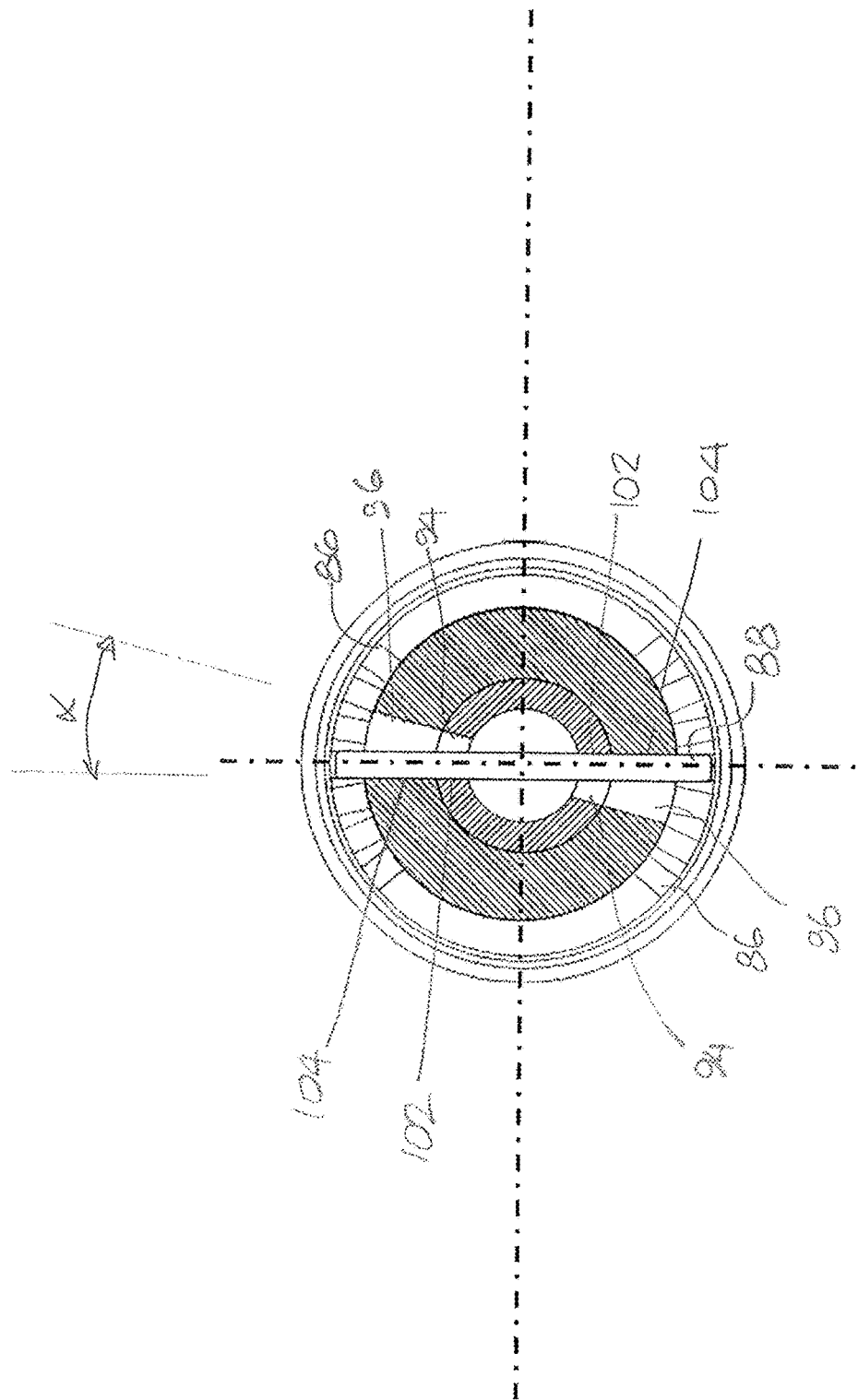

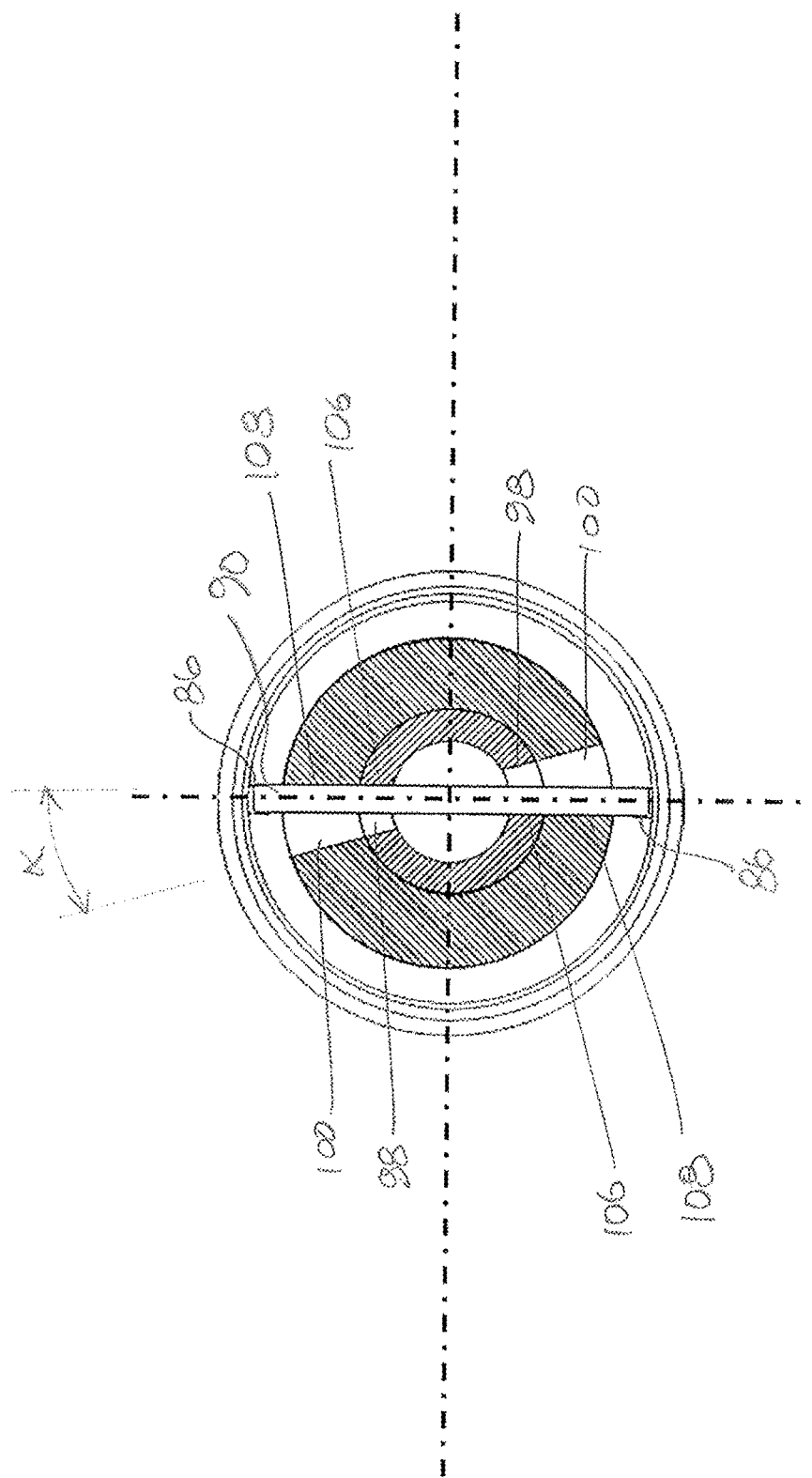

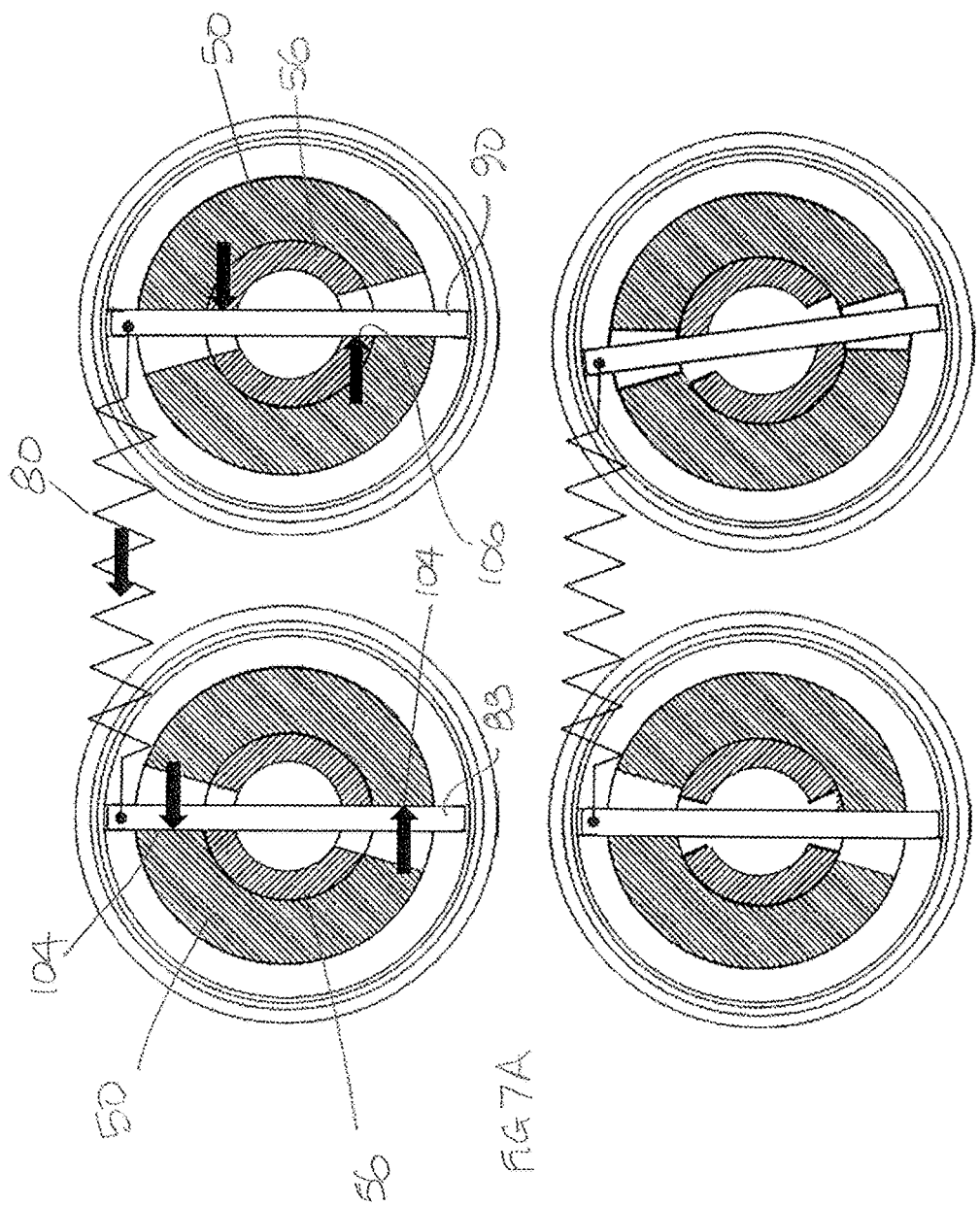

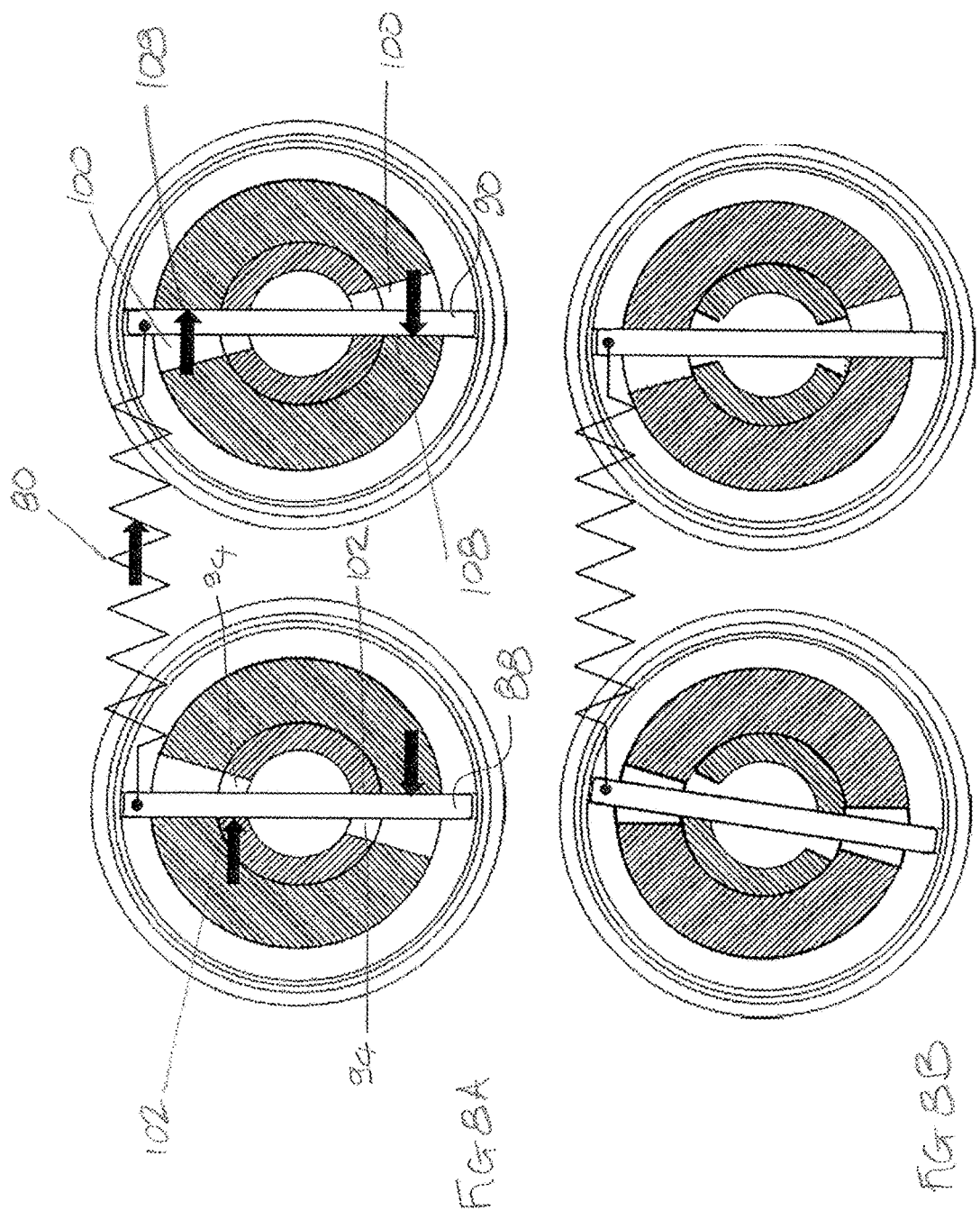

TORQUE LIMITING DEVICE

FOREIGN PRIORITY

This application claims priority to European Patent Application No. 16162452.3 filed Mar. 24, 2016, the entire contents of which is incorporated herein by reference.

TECHNICAL FIELD

The present disclosure relates to torque limiting devices as may be used, for example, in aircraft actuator systems.

BACKGROUND

Torque limiting devices are used in a wide variety of applications. One such application is in actuators used in aircraft, where the actuators may be used to deploy control surfaces, for example flaps or slats. Power is transmitted to a plurality of linked actuators from a central power drive unit. Torque limiting devices are used with each actuator to limit the maximum torque delivered to the actuator's output in the case of the deployed surface jamming. Without a torque limiting device, the entire output torque of the power drive unit would feed directly into the jammed component, requiring the relevant structure to be sized to resist such loading. This will result in weight penalties on the aircraft, which is undesirable.

Known torque limiting devices may use multiple interleaved friction plates or a torsion bar system. Whilst these systems are effective in certain applications, there remains an ongoing effort to create alternative forms of torque limiting devices.

SUMMARY

The present disclosure provides a torque limiting device comprising an input shaft, an output shaft, and a torsionally preloaded torsion spring having a first end and a second end. The first end and the second end of the torsion spring are coupled to the both the input shaft and the output shaft, whereby torque is transmitted between the input shaft and output shaft via the preloaded torsion spring. The couplings between the torsion spring and the input shaft and the output shaft permit limited relative rotation between the input shaft and the output shaft. The device further comprises a jamming mechanism operable in response to relative rotation between the input shaft and output shaft to stop rotation of both the input shaft and the output shaft.

The torsion spring may be a machined torsion spring.

The couplings between the first and second ends of the torsion spring and the input and output shafts may comprise first and second coupling pins extending through respective apertures in the input and output shafts into the torsion spring.

The openings in the input and output shafts may extend over an circumferential arc greater than the diameter of the coupling pins to permit relative rotational movement of the input and output shafts. For example, the openings may extend over an arc of 10-20°, for example 15°.

The torsion spring may be arranged around the input and output shafts.

The jamming mechanism may comprise a plurality of ramp surfaces provided on the input shaft, a static structure of the device and a plurality of roller elements arranged between the input shaft and the static structure. The roller elements may be received between adjacent ramp surfaces on the input shaft. The mechanism may further comprise an actuator coupled to the output shaft for moving the roller elements along the ramp surfaces upon relative rotation of the input and output shafts.

The actuator may comprises a plurality of teeth extending between adjacent roller elements.

The teeth may project from one end of the output shaft.

Adjacent ramp surfaces may be are circumferentially symmetrical.

The output shaft may comprise a gear for connection to an actuator input.

The torsion spring may comprises means for varying the preload of the spring.

At least one end of the torsion spring may comprise a series of circumferentially spaced opposed openings for receiving a respective coupling pin therein.

The torsion spring may be made from titanium or titanium alloy.

The disclosure also extends to an actuator system comprising an actuator having an input coupled to the output shaft of a torque limiting device as described in any of the foregoing paragraphs.

The disclosure also extends to an aircraft system comprising a plurality of actuator systems as above coupled in series to a common power drive unit.

BRIEF DESCRIPTION OF DRAWINGS

An embodiment of this disclosure will now be described, by way of example only, with reference to the accompanying drawing in which:

FIG. 1 shows an aircraft system comprising a plurality of actuators;

FIG. 2 shows a vertical cross sectional view through an actuator embodying a torque limiting device in accordance with this disclosure, with the torsion spring shown unsectioned;

FIG. 3 shows a full vertical cross sectional view through the actuator of FIG. 2;

FIG. 4 shows a sectional view along line C-C of FIG. 3 during normal operation of the actuator;

FIG. 5 shows a sectional view along line A-A of FIG. 3 during normal operation of the actuator;

FIG. 6 shows a sectional view along line B-B of FIG. 3 during normal operation of the actuator;

FIG. 7A shows, schematically force transmission in the torque limiting device during normal operation with the input shaft rotating in a clockwise direction;

FIG. 7B shows, schematically force transmission in the torque limiting device in a jammed condition with the input shaft rotating in a clockwise direction;

FIG. 8A shows, schematically force transmission in the torque limiting device during normal operation with the input shaft rotating in a counter-clockwise direction; and FIG. 8B shows, schematically force transmission in the torque limiting device in a jammed condition with the input shaft rotating in a counter-clockwise direction.

DETAILED DESCRIPTION

FIG. 1 illustrates an aircraft slat operating system 2. The system comprises a plurality of leading edge slats 4 which are selectively deployed and retracted by rotary actuators 6. Each actuator 6 is powered by a rotary drive from a common power drive unit 8. Drive is transmitted from the power drive unit 8 via a series of power transmission shaft 10 which connect the actuators 6 in series. Brakes 12 and asymmetry sensors 14 may also be included in a typical system.

As discussed above, the actuators 6 deploy and retract the slats 4. Should one of the slats 4 jam, then potentially the entire output of the power drive unit 8 may be input into that slat 4. The slat 4 and the surrounding aircraft structure would then have to be sized to react those forces, which may result in additional weight, which is undesirable. It is therefore customary to associate torque limiters with the actuators 6.

FIGS. 2 to 6 illustrate a rotary actuator drive 20 incorporating a torque limiting device in accordance with this disclosure.

With reference to FIGS. 2 and 3, the rotary actuator drive 20 comprises a drive portion 22 and an associated torque limiting device 24. The rotary actuator drive 20 includes a drive shaft 26 which extends along the entire length of the drive 20. The drive shaft 26 includes splines 28 at each end, for connection, for example, to splines provided at the ends of power transmission shafts 10 as discussed above.

The drive 20 further comprises a housing 30 which houses the drive portion 22 and the torque limiting device 24. In this embodiment the housing 30 comprises first and second housing parts 32, 34 joined together at a flanged joint 36. The end of the second housing part 32 remote from the flanged joint 36 is closed by a cover 38 which supports a bearing 40 which supports one end portion 42 of the drive shaft 26 and a rotary seal 44. Of course the housing 30 may have other constructions.

The housing 30 is fixed to static structure in use. The first housing part 32 substantially accommodates the drive portion 22 and the second housing part 34 the torque limiting device 24.

The drive portion 22 comprises a planetary gear system 46 which receives its input from an external gear 48 provided on an output shaft 50 of the torque limiting device 24. The output of the planetary gear system 46 is coupled to an external shaft 52 which is supported on the shaft 26 for rotation relative thereto by means of a bearing 54. The planetary gear system 46 acts to reduce the rotational speed of the drive shaft 26 for input to an actuator.

The torque limiting device 24 is arranged at the end 42 of the shaft 26. The torque limiting device 24 comprises an input shaft 56, which in this embodiment is provided by the end portion 42 of the drive shaft 26. That end portion 42 of the shaft 26 also comprises a roller receiving surface 58 which receives a plurality of roller elements 60 and a seat 62 for rotatably receiving the output shaft 50 of the torque limiting device 24. The roller receiving surface 58 is provided with a plurality of symmetrical ramps 64 between which the roller elements 60 locate (see FIG. 4). The roller elements 60 are received within a ring 66 which is attached to or forms a part of the second housing part 34 and forms a static structure.

As discussed above, the output shaft 50 has an external gear 48 formed at one end thereof for providing an input to the planetary gear system 46. At its other end it comprises a plurality of projecting teeth 68 which, as can be seen from FIG. 4 extend between the roller elements 60. As will be explained further below, the roller elements 60, ramps 64, teeth 68 and static ring 66 together form a jamming mechanism 78.

The output shaft 50 in this embodiment has a waisted central region 70 and first and second ends 72, 74, formed in this embodiment as flanges. This arrangement saves weight, but other configurations can be envisaged.

Arranged around the output shaft 50 is mounted a machined torsion spring 80. In this embodiment the torsion spring 80 is made from titanium or titanium alloy, although other materials may be used. The material of the spring 80 is chosen to provide the necessary strength and torsional compliance.

The torsion spring 80 has first and second ends 82, 84. Both ends 82, 84 are formed with openings 86 for receiving the ends of first and second coupling pins 88, 90. As shown in FIG. 5, at least the first end 82 of the torsion spring 80 is provided with a series of circumferentially spaced, diametrically opposed openings 86 for a purpose to be described further below. The second end 84 may be provided with just one pair of opposed openings 86. The first and second ends 82, 84 of the torsion spring 80 may be covered by caps 92 which may radially retain the coupling pins 88, 90.

As illustrated in FIGS. 5 and 6, the first coupling pin 88 extends through opposed respective openings 94 in the input shaft 56 and through opposed openings 96 in the first end 72 of the output shaft 50. The second coupling pins 90 extends through opposed openings 98 in input shaft 56 and opposed openings 100 in the second end 74 of the output shaft 50. As can be seen in FIG. 5 the openings 94, 96 and the openings 98, 100 are aligned to allow passage of the respective coupling pins 88, 90. Each opening 94, 96, 98, 100 is circumferentially larger than the coupling pin 88, 90 it receives, having an angular extent α. This allows will allow relative rotational movement between the input shaft 51 and output shaft 50 as will be described further below. In this embodiment the angle α may be between 10 and 15° for example.

The torsion spring 80 is torsionally preloaded. That is, the first and second ends 82, 84 of the torsion spring 80 are rotated in opposite directions from one another from the spring's rest position, before the coupling pins 88, 90 are inserted through the openings 94, 96, 98, 100. The required degree of preload is achieved by engaging the second coupling pin 90 in the openings 86 at the second end 84 of the torsion spring and the coupling pin 88 in the desired pair of opposed openings 86 in the first end 82 of the torsion spring 80.

The effect of this is to bias the coupling pins 88, 90 into contact with the walls of the openings 82, 84 in the input and output shafts 56, 50, as shown in FIGS. 4 and 5. The first coupling pin 88 is biased into contact with clockwise (in the sense of FIG. 5) facing surfaces 102, 104 of the openings 94, 96. However, the second coupling pin 90 is biased into contact with the counter-clockwise (in the sense of FIG. 6) facing surfaces 106, 108 of the openings 98, 100.

In operation, the drive shaft 26 of the drive 20 may rotate in either a clockwise or counter-clockwise direction, depending on the required direction of rotation of the actuator output shaft 50. FIG. 7A illustrates how torque is transmitted between the input and output shafts 56, 50 of the torque limiting device when drive shaft 26 is rotating in a counter-clockwise direction in the sense of FIGS. 5 and 6.

In this mode of operation, the counter-clockwise facing surfaces 106 of the openings 98 in the input shaft 56 transmits torque transmit torque to the coupling pin 80. This torque is then transmitted into the second end 84 of the torsion spring 80, through the torsion spring 80 into the first end 82 of the torsion spring 80 and from there into the first coupling pin 88. The first coupling pin 88 then transmits the torque to the clockwise facing surfaces 104 of the openings 96 in the first end 72 of the output shaft 50, thereby causing the output shaft 50 to rotate, thereby providing torque to the drive portion through the ring gear 48. The output shaft 50 will rotate at the same speed as the input shaft 56, so that there is no relative rotation between the two shafts.

FIG. 8A illustrates how torque is transmitted between the input and output shafts 56, 50 of the torque limiting device when drive shaft 26 is rotating in a clockwise direction in the sense of FIGS. 5 and 6.

In this mode of operation, the clockwise facing surfaces 102 of the openings 94 in the first end 72 of the input shaft 56 transmits torque transmit torque to the first coupling pin 88. This torque is then transmitted into the first end 82 of the torsion spring 80, through the torsion spring 80 into the second end 82 of the torsion spring 80 and from there into the second coupling pin 88. The second coupling pin 90 then transmits the torque to the counter-clockwise facing surfaces 108 of the openings 100 in the second end 74 of the output shaft 50, thereby causing the output shaft 50 to rotate, thereby providing torque to the drive portion through the ring gear 48. Again, the output shaft 50 will rotate at the same speed as the input shaft 56, so that there is no relative rotation between the two shafts.

The preload of the torsion spring 80 is set at a level such that during normal operation, the torque transmitted through the torsion spring 80 does not exceed the preload. In effect, the preload sets a minimum torque limiter setting. In such circumstances, the input and output shafts 56, 50 will rotate together at the same speed, with the required torque being transmitted to the actuator drive. However, should, for example, the actuator jam (as might happen if a control surface to which it is coupled jams) then the output shaft 50 would cease to rotate, or at least rotate more slowly. This will result in the torsion spring 80 preload being exceeded. As illustrated schematically in FIGS. 7B and 8B, this will cause the torsion spring to rotate the first and second coupling pins 88, 90 relative to one another, permitting relative rotation of the input and output shafts 56, 50 relative to one another. Once there is relative movement between these shafts 56, 50, the roller elements 60 in the jamming mechanism will be forced up the ramps 64 on the roller receiving surface 58 of the input shaft 51 by the teeth 68 of the output shaft 50, thereby forcing the roller elements 60 into wedged contact with the static ring 66 of the housing 30, thereby stopping the rotation of the input shaft 51. The torque is then, in effect, absorbed in the ring static structure 61 rather than being transmitted to the actuator to avoid damage to the actuator.

Due to the symmetrical configuration of the ramps 64, the device will operate at the same degree of relative angular displacement irrespective of the direction of rotation of the input shaft 51.

The aim of the torque limiting device 24 is to operate as quickly as possible after a fault occurs to avoid damage to the actuator or component to which it is mounted. The torque value with which the torque limiting device 24 will operate is determined by the torsional spring rate of the torsion spring 80 and the degree of preload. In the embodiment described above, the jamming mechanism 78 is activated with about 5° of relative rotational movement of the input and output shafts 56, 50. In embodiments of the invention, the ratio of the minimum setting torque, determined by the torsion spring preload, and the torque at which the jamming mechanism operates may be in the region of 1:1.08.

It will be appreciated that if the torque limiting device is embodied in a system as illustrated in FIG. 1 where a number of actuators are connected in series, as soon as the torque limiting device 24 operates, it will stop the rotation of the entire transmission line as all the drive transmission shafts 10 will cease to rotate. Having all actuators cease operation is desirable since it will prevent asymmetrical deployment of the slats which would be undesirable.

It will be appreciated that the embodiment described herein has a number of advantages. In view of the arrangement of the torsion spring 80 around the input and output shafts 56, 58, it provides a relatively compact construction, which is advantageous in restricted operating spaces, such as aircraft wings. Also, the desired degree of preload of the torsion spring 80 can be easily set.

The above description is of an exemplary embodiment only, and it will be clear that modifications may be made to the embodiment without departing from the scope of the disclosure. For example, while the output shaft 50 of the torque limiting device has been illustrated as a single component, it may be formed as a number of components suitably joined or coupled together. The pattern of openings 86 in the spring end 84 may differ in order to achieve the required resolution of preload in the spring. A combination of openings 86 may also be provided in both spring ends 82 and 84 to further enhance preload setting. Although these openings 86 are depicted as holes they may take the form of slots In addition, while a machined torsion spring 80 has been disclosed, other torsion springs may be used, for example coil springs. Machined torsion springs may, however, be advantageous in that they facilitate providing integrated spring ends for receiving the coupling pins.

Also, while the torque limiting device has been disclosed as being used in an aircraft actuator application, it may of course be used in other applications.

The invention claimed is:

1. A torque limiting device comprising:
   an input shaft;
   an output shaft;
   a torsionally preloaded torsion spring having a first end and a second end;
   the first end and the second end of the torsion spring being coupled to both the input shaft and the output shaft by couplings, whereby torque is transmitted between the input shaft and output shaft via the preloaded torsion spring, the couplings between the torsion spring and the input shaft and the output shaft permitting limited relative rotation between the input shaft and the output shaft; and
   a jamming mechanism operable in response to relative rotation between the input shaft and output shaft to stop rotation of both the input shaft and the output shaft.

2. The torque limiting device as claimed in claim 1, wherein the torsion spring is a machined torsion spring.

3. The torque limiting device as claimed in claim 1 wherein the couplings between the first and second ends of the torsion spring and the input and output shafts comprise first and second coupling pins extending through respective apertures in the input and output shafts into the torsion spring.

4. The torque limiting device as claimed in claim 3 wherein the apertures in the input and output shafts extend over an circumferential arc ($\alpha$) greater than the diameter of the coupling pins to permit relative rotational movement of the input and output shafts.

5. The torque limiting device as claimed in claim 4, wherein the circumferential arc is between 10° and 20°.

6. The torque limiting device as claimed in claim 4, wherein the circumferential arc is 15°.

7. The torque limiting device as claimed in claim 1, wherein the torsion spring is arranged around the input and output shafts.

8. The torque limiting device as claimed in claim 1, wherein the jamming mechanism comprises:
- a plurality of ramp surfaces provided on the input shaft;
- a static structure of the device;
- a plurality of roller elements arranged between the input shaft and the static structure and received between adjacent ramp surfaces; and
- an actuator coupled to the output shaft for moving the roller elements along the ramp surfaces upon relative rotation of the input and output shafts.

9. The torque limiting device as claimed in claim 8, wherein the actuator comprises a plurality of teeth extending between adjacent roller elements.

10. The torque limiting device as claimed in claim 9 wherein said teeth project from one end of the output shaft.

11. The torque limiting device as claimed in claim 8, wherein adjacent ramp surfaces are circumferentially symmetrical.

12. The torque limiting device as claimed in claim 1, wherein the output shaft comprises a gear.

13. The torque limiting device as claimed in claim 1, wherein the torsion spring comprises means for varying the preload of the spring.

14. The torque limiting device as claimed in claim 13, wherein at least one end of the torsion spring comprises a series of circumferentially spaced opposed openings for receiving a respective coupling pin therein.

15. The torque limiting device as claimed in claim 1 wherein the torsion spring is made from titanium or titanium alloy.

16. An actuator system comprising an actuator having an input coupled to the output shaft of the torque limiting device of claim 1.

17. An aircraft system comprising a plurality of actuator systems as claimed in claim 16 coupled in series to a common power drive unit.

* * * * *